J. H. FLEETWOOD.
FILTER.
APPLICATION FILED MAY 29, 1920.

1,412,557.

Patented Apr. 11, 1922.
3 SHEETS—SHEET 1.

Inventor
James H. Fleetwood.

By Bradford Morrill Birman
Attorneys

J. H. FLEETWOOD.
FILTER.
APPLICATION FILED MAY 29, 1920.

1,412,557.

Patented Apr. 11, 1922.
3 SHEETS—SHEET 2.

Inventor.
James H. Fleetwood
By Bradford Morrill Birman
Attorneys.

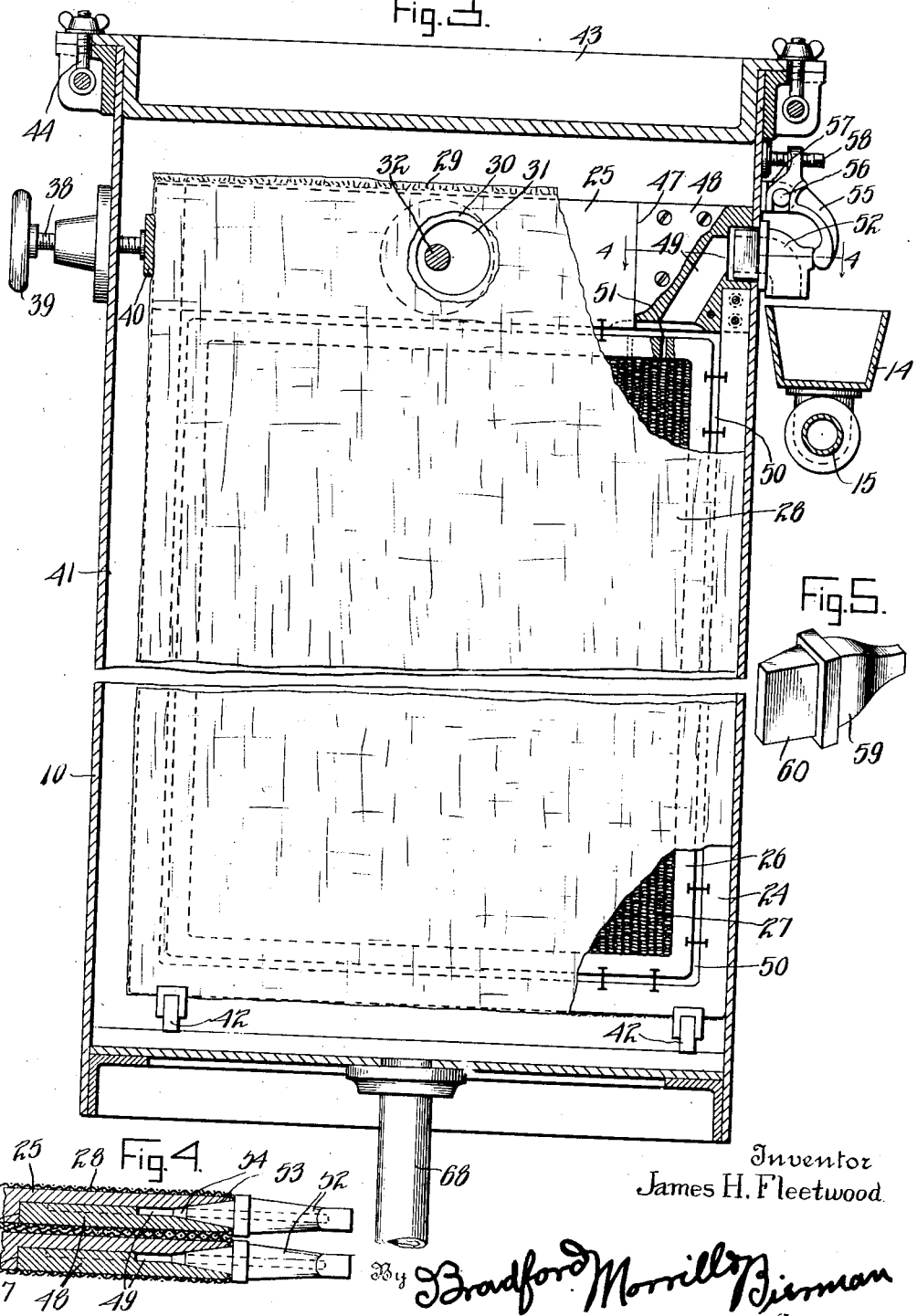

UNITED STATES PATENT OFFICE.

JAMES H. FLEETWOOD, OF NEW ORLEANS, LOUISIANA.

FILTER.

1,412,557.  Specification of Letters Patent.  Patented Apr. 11, 1922.

Application filed May 29, 1920. Serial No. 385,342.

*To all whom it may concern:*

Be it known that I, JAMES H. FLEETWOOD, a citizen of the United States, residing at New Orleans, in the parish of Orleans and State of Louisiana, have invented certain new and useful Improvements in Filters, of which the following is a specification.

This invention relates to filters and while especially designed for filtering cane juice in the manufacture of sugar, syrup and the like, is of course not limited in its utility to such function.

An object of the invention is to provide an improved form of filter element and container therefor, whereby a very large number of elements are subjected to filtering pressure and means for discharging the filtrate separately from any one of the elements.

A further object of the invention is to provide improved means for washing and cleaning the filter unit, without removing the elements from the unit.

Figure 1:
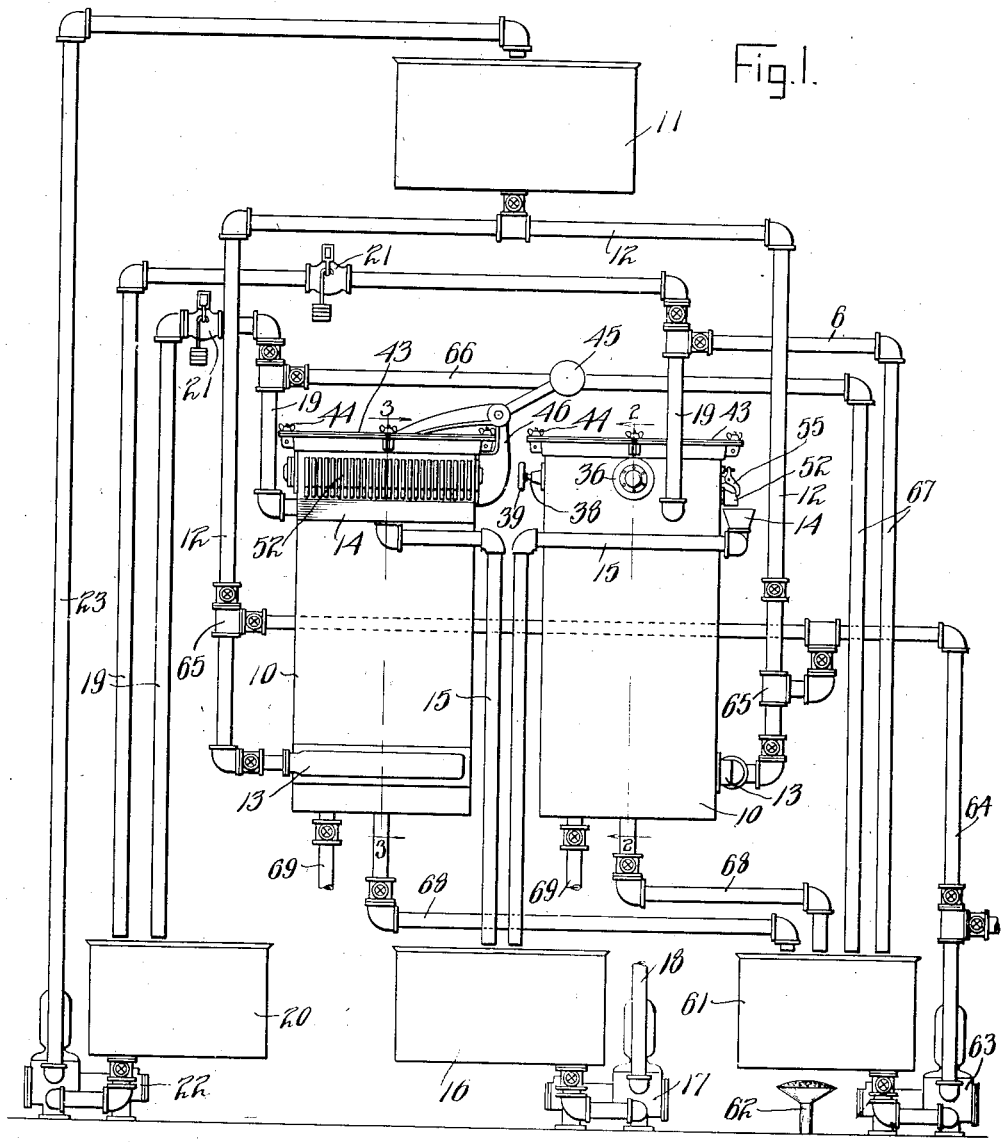
Figure 2:
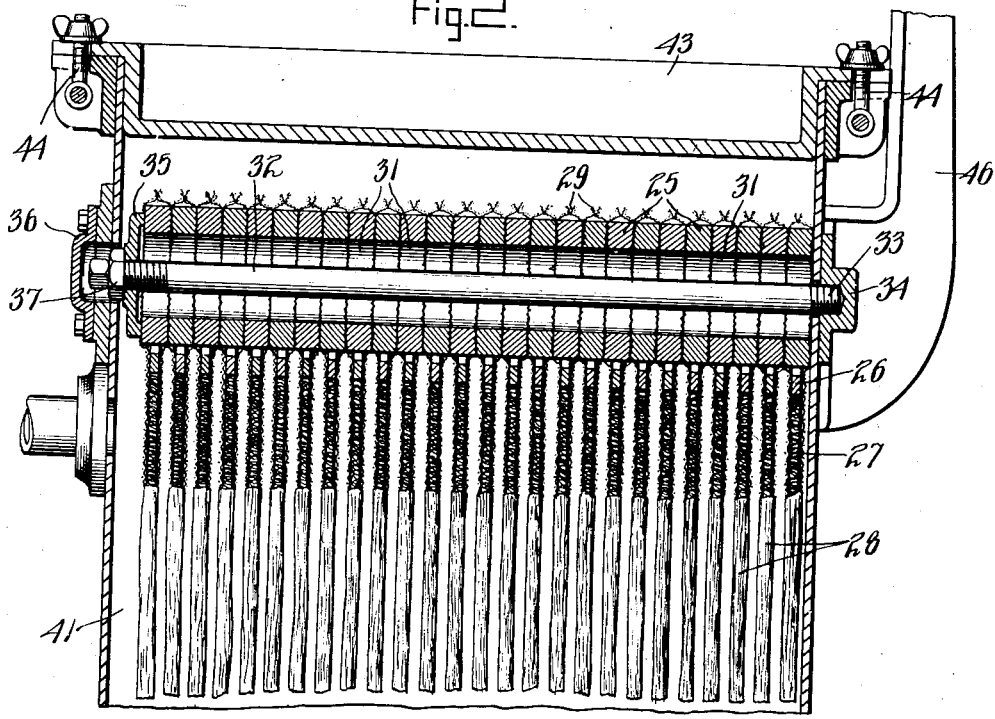
Figure 2:
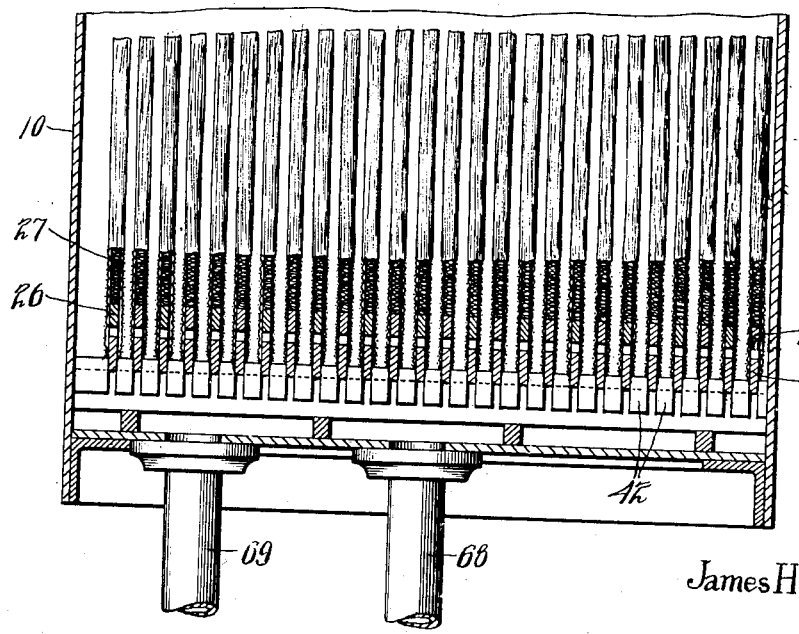

In the accompanying drawings, which are made a part hereof and on which similar reference characters indicate similar parts, Figure 1 is a view of an installation of two units shown somewhat diagrammatical, it being understood that the number of units may be varied as circumstances may require, or make desirable, and that the positions of the several parts may be varied according to location, Figure 2 a vertical sectional view through one of the units, as indicated by line 2—2 of Figure 1, Figure 3 a vertical sectional view through one of the units, taken at right angles to the plane of Figure 2 and as indicated by line 3—3 of Figure 1, Figure 4 a detail, fragmentary view showing the manner of attaching the individual discharge spouts to the elements, and Figure 5 a perspective view of a plug which is employed to replace any of the discharge spouts when, for any reason it is desirable to interrupt discharge liquid in the usual manner, such occasions arising, for instance, when one of the elements is not properly filtering, in which case a single one of the discharge spouts will be replaced, or when the unit is to be washed, in which case all of the discharge spouts would be replaced.

The improved filter is of the general type disclosed in Patent No. 1,107,924 August 18, 1914, and is intended as an improvement thereon. The filter installation comprises one or more units, indicated at 10. The liquid to be filtered is introduced into the units under pressure, which may be by gravity from the supply tank 11, through pipes 12 and the headers 13. The liquid, after being filtered, in the manner to be hereinafter more fully described, is discharged into troughs 14 communicating with pipes 15 which discharge into a tank 16, the tank 16 may be provided with a pump 17 which will transmit the liquid from the tank 16 through the pipe 18 to any storage or point of use.

As in said Patent No. 1,107,924, provision is made for a continual circulation of the raw liquid through the units, unfiltered, for the purpose of carrying off as much of the sediment as may be, without depositing the same upon the elements. This comprises pipes 19 which discharge into a tank 20, tension valves 21 being employed to maintain sufficient pressure in the units 10. From the tank 20 a pump 22 conveys the fluid through the pipe 23 back to the original source of supply, 11.

Each of the units 10 comprise a casing or housing into which the elements are inserted. The elements comprise frames 24 having cross-bars 25 at the top and slightly smaller than one of the dimensions of the housing. Within the frame 24 and below the cross-bar 25 an auxiliary frame 26 is employed having woven or coiled wire filling 27 or any other approved means for maintaining space between the side section of fabric 28 formed as a bag to embrace the entire frame 24 and cross-head 25. This bag is sewed at the top, as indicated at 29 whereby the frames are each wholly embraced by a bag. The frames and bag, thus organized form one of the elements. The bag 28 is preferably provided with registering openings 30, upon opposite sides, which also register with an opening 31 through each of the cross-bars 25 so that there is a passage entirely through the battery of juxtaposed elements for the passage of the tension rod 32. This rod is threaded at 33 (see Figure 2) for engagement with a cap 34 and a washer 35 is employed thereon. A handhole cover 36 is employed to permit access to the nut 37 by which tension is applied to bind the several elements firmly together to prevent the passage of liquid therethrough or therebetween. A second positioning means is also employed comprising a plurality of screws 38 having hand wheels 39 engaging a transverse bar 40 within the housing whereby the bar, bearing against the edges of the several elements, force the elements against the side of the housing opposite. In this manner the battery of elements is by the rod 32 and the screw 38 forced away from the two sides of the housing and into engagement with the opposite sides, that is to say, the combined body of elements is forced into one of the corners of the housing, leaving an L-shaped chamber 31 about two sides of the associated elements. The elements are also supported and spaced by means of supports 42 at the bottom of the housing.

The housing is closed by a closure 43 which is applied in the usual well-known manner by the use of pivoted tension bolts 44. A counter weight 45 is also movably employed fulcrumed upon the bracket 46, although this is a matter of convenience and forms no part of the invention.

The several cross-heads 25 are rabbeted out, as at 47, and plates 48 are applied thereto having mill slots 49 formed therein communicating with the space 50 between the frames 24 and 26. Communication from the interior of the frame 26 to the space 50 may be had in any approved manner as by the passages 51 whereby the fluid, passing through the fabric 28 into the space provided by the coils 27, will pass through the frame 26 into the space 50 and thence into the mill slot 49.

Each of the mill slots 49 is provided with a discharge spout 52 which communicates with the mill slot 49 and discharges into the trough 14. The discharge spout 52 is provided with a tapered shank 53 which is inserted into the tapered opening 54 which terminates the mill slot 49. Each spout is held in position by means of a finger 55 having a slot embracing a pin 56 on the bracket 57 and with a tension screw 58 for maintaining the spout in position.

A plug 59, having a tapered shank 60 but no perforation or passage, is provided to take the place of the spout 52 upon certain occasions, as will be hereinafter more fully described.

It is desirable to wash the organized structure and especially the elements frequently without dismantling or withdrawing the elements from the housing. For this purpose a tank 61 is employed preferably with means for heating water therein, conventionally shown at 62. A pump 63 takes water from this tank forcing it through the pipe 64 to the coupling 65. By valve connections the heated water from the pump may pass into the header 13 and after circulating about and among the elements pass outwardly through the pipes 19 and by manipulating the valves through the pipes 66 to the pipes 67 and returned to the tanks 61. Other pipes 68 also lead off from the units so that the draining of the units back into the tank 61 may be completed after the washing process has been performed or may be employed to continue the washing process to wash out the sediment of the bottom of the housing. Drain pipes 69 to the sewer or other passage from the units is also provided.

Valves are employed wherever convenience may dictate for the purpose of directing the flow of fluid through the requisite system of pipe to perform the function required and such valves being clearly shown in Figure 1, a description of their location and operation is not believed to be necessary.

It is believed that the operation of the units and systems as an entirety as well as the operation of the elements and their association will be completely understood from the foregoing.

It might be explained, however, that the discharge spouts 52 are employed one for each element so that in case of breakage or when for any other reason that particular element may "run dirty" that spout may be removed and the plug 59 substituted.

When the unit is to be washed all of the spouts 52 are removed and replaced by plugs whereby the wash water is confined within the unit until discharged, as aforesaid.

Having thus fully described my said invention what I claim as new and desire to secure by Letters Patent, is—

In a filter, a unit embodying a plurality of independent contained filter elements, a plurality of discharge spouts insertable through the housing, each into discharging engagement with one of the elements independently, means to exert tension upon and retain the spout and a plug proportioned to replace a removed spout and to employ the same retaining tension mechanism.

In witness whereof, I have hereunto set my hand and seal at New York, N. Y. this 22nd day of May, A. D. nineteen hundred and twenty.

JAMES H. FLEETWOOD. [L. S.]

Witnesses:
 EDWARD J. CONLON,
 SOLON WEST.